Aug. 11, 1964 P. H. LANDOLT 3,144,371
METHOD OF PRODUCING DRY TYPE CAPACITORS
Filed Dec. 2, 1959 2 Sheets-Sheet 1

Inventor:
Paul H. Landolt,
by Henry J. Marciniak
Attorney.

Aug. 11, 1964   P. H. LANDOLT   3,144,371
METHOD OF PRODUCING DRY TYPE CAPACITORS
Filed Dec. 2, 1959   2 Sheets-Sheet 2

```
┌─────────────────────────────────────────────────────┐
│ IMPREGNATING A CAPACITOR ROLL WITH A MIXTURE OF A   │
│ MONOVINYL ARYL COMPOUND AND AT LEAST ONE POLY-      │
│ VINYL ARYL COMPOUND, AND A POLYMERIZATION CATALYST  │
│ IN AN AMOUNT FROM .1 TO 1 PERCENT OF THE COMPOSITION│
│ AND HAVING A DECOMPOSITION TEMPERATURE BETWEEN      │
│ 120 AND 180 DEGREES CENTIGRADE CORRESPONDING TO A   │
│ HALF-LIFE OF 1 TO 10 MINUTES;                       │
└─────────────────────────────────────────────────────┘
                          │
                          ▼
┌─────────────────────────────────────────────────────┐
│ HEATING THE ROLL AT A TEMPERATURE RANGING FROM      │
│ 150 TO 200 DEGREES CENTIGRADE FOR A PERIOD OF       │
│ TIME RANGING BETWEEN 1 TO 5 MINUTES TO SEAL THE     │
│ CAPACITOR ROLL; AND                                 │
└─────────────────────────────────────────────────────┘
                          │
                          ▼
┌─────────────────────────────────────────────────────┐
│ HEATING THE ROLL THEREAFTER AT A TEMPERATURE FROM   │
│ 120 TO 150 DEGREES CENTIGRADE FOR A PERIOD FROM 5   │
│ TO 120 MINUTES.                                     │
└─────────────────────────────────────────────────────┘
```

FIG. 4

INVENTOR.
PAUL H. LANDOLT
BY *Henry J. Marciniak*
ATTORNEY

United States Patent Office 3,144,371
Patented Aug. 11, 1964

3,144,371
METHOD OF PRODUCING DRY TYPE
CAPACITORS
Paul H. Landolt, Danville, Ill., assignor to General Electric Company, a corporation of New York
Filed Dec. 2, 1959, Ser. No. 856,800
7 Claims. (Cl. 156—184)

This invention relates to electrical capacitors and a method of producing them. More particularly, it relates to a dry type of capacitor impregnated with a copolymer of a monovinyl aryl monomer or polymer or mixtures thereof and at least one polyvinyl aryl monomer and characterized by significantly improved corona start voltages and low losses at temperatures as high as 150 degrees centigrade.

Capacitors utilizing solid resinous impregnants are well known in the art. However, such capacitors have generally been found to be impracticable for commercial alternating current applications at voltages above 150 volts. One of the principal drawbacks to the use of the copolymers as dielectric impregnants has been the shrinkage and leakage that occurs during polymerization Such shrinkage and leakage results in the formation of voids. If air, moisture or other gas is present in sufficient quantity in these voids, gaseous ionization takes place. This is reflected in an increase of dielectric loss and a rising power factor-voltage curve or a decreased corona start voltage. Thus, the most serious disadvantage in the employment of copolymers as solid dielectric impregnants in a dry type of capacitor resides in the formation of voids in the dielectric layers of capacitor produced by past methods.

The prevention and reduction in size of these voids has constituted a major problem in the production of dry type of capacitors suitable for alternating current applications at higher voltages. Because of the relatively great influence of these voids on the dielectric properties and life of the dielectric layers, it would be desirable to have some way of directly measuring them. At present, such measurements have not been practicable due to the extremely small volumes involved and inherent difficulties in making such measurements.

In determining suitability of solid resinous impregnants for alternating current applications at high voltages, the corona start voltage is an extremely significant property. Corona start voltage of an insulation medium, as the term is used herein, is the minimum voltage capable of causing a measurably small ionization current to flow into the insulation medium. In the measuring apparatus used to determine the corona start voltages of the capacitors produced according to the present invention, the smallest ionization current capable of measurement was of the order of 1/500 of a microampere. It is a desirable characteristic of a dry type of capacitor that it possess a relatively high corona start voltage so as to permit its use in alternating current applications above 150 volts and as high as 400 volts.

Another disadvantage of the dry type of capacitors produced by past methods has been the increased losses that occur when the capacitor is employed at higher temperatures as evidenced by an increased dissipation factor. The dissipation factor is a measure of the power losses of the capacitor and is defined as the ratio of parallel reactance to the parallel resistance of the capacitor. Since the power losses, and particularly the power loss due to dielectric hysteresis in alternating current applications, result in the production of heat, the dissipation factor is a significant characteristic in determining the suitability of capacitors employing solid resinous dielectrics for alternating current applications at high temperatures. An increasing dissipation factor means that the capacitor has increased power losses which are accompanied by the production of heat. The cumulative effect of an increased ambient temperature and heat produced by increased power losses contributes rapidly to the dielectric breakdown of the capacitor. Thus, it is a desirable characteristic that a capacitor employing solid resin impregnants as a dielectric possess a low dissipation factor in its operating temperature range.

For economic reasons, it is desirable that a dry type of capacitor employing solid resinous impregnants be developed that is suitable as a replacement for the encased liquid filled capacitor. The metal container in which the liquid filled capacitor is encased represents an added manufacturing cost as compared with a dry type of capacitor that does not require a metal container. Further, in many applications it is required that other electrical components be protected from possible damage caused by leakage of the liquid dielectric or by the forces resulting from a rupture of the metal container. Accordingly, it is desirable that a capacitor employing solid resinous impregnants as a dielectric have sufficient mechanical strength to make it possible to use the capacitor without need for encasing the capacitor in a metal container.

It is therefore a general object of this invention to provide an improved capacitor employing a solid resinous impregnant as a dielectric suitable for alternating current applications between 150 and 400 volts.

Another object of this invention is to provide an improved method of curing a capacitor impregnated with a mixture of a monovinyl aryl monomer or polymer or mixtures thereof and a polyvinyl aryl monomer so that the capacitor will be characterized by a significantly improved corona start voltage.

It is still another object of the invention to provide an improved capacitor suitable for alternating current applications at temperatures as high as 150 degrees centigrade.

A further object of the present invention is to provide an improved method of producing a capacitor utilizing a copolymer of a monovinyl aryl monomer or polymer or mixtures thereof and at least one polyvinyl aryl monomer as a dielectric and characterized by a significantly improved dissipation factor at higher temperatures.

It is still a further object of the present invention to provide an improved dry type of capacitor that can be employed in alternating current applications at higher voltages without having to encase the capacitor in a metal container.

The foregoing objects and others are attained in accordance with the present invention by shock curing a capacitor roll impregnated with a copolymer producing mixture of a monovinyl aryl monomer or polymer or mixtures thereof and at least one polyvinyl aryl compound monomer in a high heat transfer medium at a temperature ranging from 120 to 185 degrees centigrade for a time interval from 5 minutes to 120 minutes, the copolymerization of the mixture being effected by chemical or radiation initiation in order to seal the roll at the outset of the curing period.

In another aspect of the invention the sealing of the capacitor roll may be brought about by an initial shock curing at a temperature from 150 to 200 degrees centigrade for a period of time ranging from 1 to 5 minutes followed by curing at a reduced temperature ranging from 120 to 150 degrees centigrade for a period from 5 to 120 minutes.

It will be seen that shock curing in accordance with the present invention involves a curing process in which there is brought about at the outset of the curing period a cross linking or chain branching of the polymers at a greater rate in the ends and outer dielectric layers of the capacitor roll than in the interior of the roll. The resulting crosslinked polymers in the ends and outer dielectric layers, in effect, seal the roll. At this point, an initial shock cure, as the term is used herein, of the roll is effected. A post cure period follows during which further crosslinking of polymers in the interior of the roll is effected. Where the curing in accordance with the present invention is carried out at a constant temperature, shock curing, as the term is used herein, includes the post curing operation.

According to the present invention, post curing is accomplished in a comparatively short period of time since incomplete crosslinking of the polymers is preferred. I have found that a complete crosslinking of the polymers results in the formation of a hard and brittle dielectric layer which is accompanied by in increased amount of contraction of the layer. This contraction causes voids in the dielectric layer which are detrimental to the dielectric properties of the capacitor.

Mixtures of monovinyl aryl compounds and polyvinyl aryl compound monomers are conventionally copolymerized by a stepped up curing cycle in which the temperature is gradually increased and the curing is carried out over comparatively extended periods ranging from 6 to 36 hours. Such a curing cycle is described in U.S. Patent 2,665,400 for copolymer mixtures similar to those employed in the practice of this invention.

In the past, it was generally thought that in order to obtain improved dielectric properties a stepped up or prolonged low temperature curing cycle was necessary to minimize thermal stressing which was believed to be a substantial factor in producing voids in the resulting copolymer solid layer. On the contrary, I have discovered that stepped up or prolonged low temperature curing of a resinous impregnant in a capacitor roll, as compared with the shock curing treatment of this invention, resulted in an increased evaporation of the volatile constituents in the resins, an increased leakage of the impregnant during curing, and an increased contraction of the resulting copolymer mixture due to complete crosslinking, all of which were found to be appreciable factors in producing voids. Thus, by the shock curing and a shortened period of post curing, it is possible to minimize the effects of the evaporation of volatile constituents, leakage during the curing treatment and the contraction of the resulting copolymer.

Surprisingly, I have discovered that a capacitor roll employing a shock cured or copolymerized mixture as described had a corona start voltage from 60 to 70 percent greater than would be obtained if an identical capacitor were cured by a conventional stepped up or constant temperature curing cycle. Also, the capacitor shock cured in accordance with the invention possessed a significantly improved dissipation factor at higher voltages. As an example, at 400 volts the shock cured capacitor had approximately the same dissipation factor at a temperature of 150 degrees centigrade that it had at 25 degrees centigrade.

The subject matter which I regard as my invention is set forth in the appended claims. The invention itself, however, together with further objects and advantages thereof may be better understood by referring to the following description taken in connection with the accompanying drawings in which:

FIGURE 4 is a block diagram representation of one form of the improved method.

Figure 1:
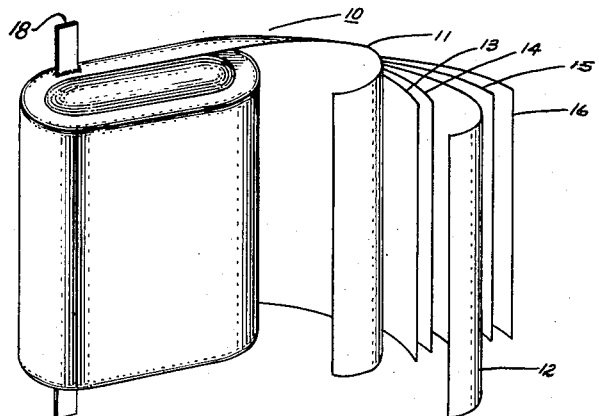
FIG. 1 is a perspective view of a partly unrolled capacitor construction of the present invention.

The capacitor assembly 10 shown in FIG. 1 is of the dry rolled type. It includes a pair of metal foil armatures 11, 12, and dielectric layers 13, 14, 15, and 16. The capacitor assembly 10 is produced by winding two strips of metal foil 11, 12 and the four dielectric layers 13, 14, 15, 16 so that there are two dielectric layers interleaved between each of the metal foil armatures 11, 12.

In the preferred practice of the invention, while the capacitor assembly 10 is being wound, a pressure of approximately 40 pounds per square inch is maintained on the capacitor roll by a kisser roller to minimize air entrainment and maintain a close dielectric spacing. It was found that pressure above one atmosphere gave improved results. The application of pressure to the roll, as it is being wound, results in the advantage that the greatest amount of capacitance is possible from a given amount of foil and paper used. The rolls formed by this method are referred to as "hard rolled" to distinguish them from the rolls formed by conventional methods which are relatively soft due to the air film existing between the layers of paper and foil.

It is to be noted that the armature metal foil strip 11 as rolled protrudes from one end of the roll 10 for a distance of approximately one sixteenth of an inch. One thirty-second of an inch was found to work equally as well. The other armature metal foil strip 12 protrudes out of the roll 10 at the opposite end for approximately the same distance. These protruding edges of the armatures 11, 12 are pressed against the ends of the roll 10 after winding. It was found that during the curing operation small quantities of the resinous impregnant leaked out of the coil and that by pressing the protruding ends of the foil armatures 11, 12, a sealed structure is obtained which reduces seepage of the impregnant from the capacitor roll. Thus, it is possible to minimize the problem associated with the formation of voids in the capacitor roll 10. Electrical contact is made with the foil armatures 11, 12 by means of the tap straps 18 and 19, which can be welded or soldered to obtain an improved electrical contact.

Each of the dielectric layers 13, 14 and 15, 16 are approximately .0005 of an inch in thickness. Although in the exemplification of the invention the layers 13, 14, 15 and 16 are of kraft capacitor paper, other types of suitable impregnable material may be used. Two sheets of .0005 kraft capacitor paper were found to be satisfactory for voltages of 300 volts. Additional layers of paper may be used for higher voltages.

In the preferred embodiment of the invention, aluminum foil was used for the metal foil armatures 11, 12. It will be apparent that other conducting materials which will not inhibit the curing, such as tin or aluminum metallized paper, can be used.

In broad outline, a capacitor according to the present invention is made by first winding the metal foil armatures 11, 12 and the interleaved dielectric layers 13, 14, 15, 16 to form a hard roll 10 with the armature foil 11 protruding at one end of the roll 10 and the armature 12 of opposite polarity protruding at the other end as hereinbefore described. The roll 10 thus formed is first dried in air and then in a vacuum oven to remove moisture in the roll. After the roll 10 is dried, it is then impregnated under a vacuum followed by pressure with a resin composition and catalyst to be hereinafter more fully described. When the impregnation is completed, the capacitor roll 10 is shock cured by immersion in a high transfer medium, such as castor oil, at a temperature between 120 and 185 degrees centigrade or it may be shock cured in air by using a stepped down temperature cycle.

In general, impregnants which can be used to practice the invention are mixtures of monovinyl aryl compound monomers or polymers or mixtures thereof and at least one polyvinyl aryl compound monomer, the latter being present in amounts of from about one to ten percent of the total composition. It will be realized that where monomers and polymers are referred to herein they can be single monomers or polymers or mixtures of various monomers and polymers. The impregnants employed in the exemplification of the method of this invention as hereinafter described are composed of a copolymer of vinyltoluene, poly (alpha methyl styrene) and divinyl benzene, the divinyl benzene being present in amounts ranging from one to ten percent by weight.

The copolymer mixture may also include polyvinyl aryl compounds such as polydivinyl chlorobenzene, polydivinyl xylene, polydivinyl ethyl benzene, polydivinyl phenyl or polyvinyl ethers, which are partially polymerized to the extent required to maintain their solubility in the monomers; and monovinyl aryl compounds such as vinyl carbazole, vinyl chlorobenzene, vinyl ethyl benzene or vinyl naphthalene. The foregoing polymerizable compounds are well known in the art and are described in U.S. Patent 2,366,007.

The following illustrative examples are presented of the resin compositions which may be used as an impregnant in the practice of the present invention, all percentages being by weight:

Example 1

| | |
|---|---|
| Poly(alpha methyl styrene) | 40 |
| Vinyl toluene | 55 |
| Divinyl benzene | 5 |

Example 2

| | |
|---|---|
| Poly(alpha methyl styrene) | 40 |
| Styrene | 55 |
| Divinyl benzene | 5 |

Example 3

| | |
|---|---|
| Poly(alpha methyl styrene) | 30 |
| Vinyl toluene | 68 |
| Divinyl benzene | 2 |

Example 4

| | |
|---|---|
| Poly(alpha methyl styrene) | 20 |
| Vinyl toluene | 79 |
| Divinyl benzene | 1 |

The catalysts, which can be employed in the practice of this invention, must have suitable half-life characteristics in order that the copolymer mixture can be shock cured. I have found that a suitable catalyst is one having a half-life of from one to ten minutes in benzene at a temperature between 120 and 180 degrees centigrade. Organic peroxides and hydroperoxides, which have decomposition temperatures within the foregoing ranges, such as tertiary butyl hydroperoxides, tertiary butyl perbenzoate, dicumyl hydroperoxide, methyl ethyl ketone peroxide, benzoyl peroxide or tertiary butyl peroxyisobutyrate, can be used. As used herein, the term "catalyst" includes one or more organic compounds which as combined possess the requisite half-life characteristic. It is apparent that different organic peroxides, for example, which do not individually possess the requisite half-life characteristic may, when combined, be suitable. Therefore, it is not intended to limit the scope of this invention to use a single organic compound as a catalyst.

The amount of the catalyst to be employed in accordance with the present invention may vary from .1 to 1 percent by weight of the copolymer mixture. In the exemplifications of the invention hereinafter described, .8 percent of tertiary butyl hydroperoxide was used. It will be appreciated that one or more of the polymerization catalyst can be combined and added to the impregnant.

Further, it was found that the use of a chemical catalyst can be eliminated if copolymerization is brought about by radiation treatment of the mixture. For example, X-ray or a radiation treatment with cobalt 60 may be used, if desired. It is not intended that the practice of the present invention be limited to a process in which the polymerization is initiated solely by activation of a chemical catalyst. As the term, initiating copolymerization, is used herein, it denotes both chemical and radiation means for starting copolymerization.

Considering now in more detail the steps of the method of the present invention, the wound capacitor roll is first heated to dryness to remove moisture. This drying treatment may be carried out at a temperature ranging from 90 to 180 degrees centigrade depending on the length of the drying cycle. It is preferred in practice of this invention to carry out the drying treatment in two steps, an air drying and a vacuum drying step. As an example, for a capacitor roll three inches long and having a volume of approximately four and a half cubic inches, drying operation can be completed after two hours of heating in dry air followed by cooling in a vacuum for about two hours or until a vacuum of 15 microns is attained.

After the drying operation is completed, the rolls are preferably kept vacuum until the rolls are submerged in the impregnant. Preferably, the treatment tank in which the drying operation is carried out should be connected to the resin reservoir in order that the resin can be introduced into the tank under a vacuum.

Before impregnation, the resin mixture is prepared, and for proper impregnation of the capacitor with a polymer mixture, such as I have described in Example 1, I have found that a viscosity ranging from 10 to 20 centipoises at 25 degrees centigrade produced satisfactory results. The prepared copolymer mixture is then degassed by placing the mixture under a vacuum of one millimeter of mercury.

In the capacitors used to exemplify the present invention, the impregnation was accomplished as follows:

The mixture for copolymerization was introduced under a vacuum into a treatment tank in order to facilitate the impregnation of the roll by capillary action. When the mixture was brought to a level at which the rolls were completely immersed, nitrogen at atmospheric pressure was introduced into the treatment tank. Dry air may also be used in place of nitrogen. For rolls having a volume of four and a half cubic inches and length of three inches, it was found that 20 minutes at a vacuum of one millimeter of mercury followed by one hour at one atmosphere under nitrogen resulted in a satisfactory impregnation of the rolls. It will be appreciated that the length of time required for proper impregnation of a roll depends upon a number of factors, such as the viscosity of the mixture and the capacitor roll dimensions. The lengths of time required for the specific rolls and resinous impregnations used were determined by a process of trial and error.

After the rolls have been impregnated they are subjected to a curing treatment in accordance with the present invention. Contrary to the conventional practice of stepped up curing or slow curing at relatively low temperatures, I have found out that a significantly improved corona start voltage can be obtained by a shock curing process. The process involves subjecting the impregnated rolls with the prepared copolymer mixture and preselected catalyst to a high temperature ranging from 120 to 185 degrees centigrade for short periods of time ranging from 5 to 120 minutes. In the preferred practice of this invention the shock curing is carried out in a liquid medium. The purpose in using a liquid is to obtain an improved heat transfer to the mixture to be copolymerized and catalyst in situ. In all but one of the exemplifications of the invention herein described, a castor oil was used. Other suitable high heat transfer media, which are not solvents of the impregnant, such as silicone, oils and mineral oils, may be used.

Also, it was found that a shock curing process in which a stepped down temperature cycle was used produced improved results. To accomplish curing in accordance with this invention by a stepped down temperature cycle, the impregnated capacitor roll is brought to a temperature ranging from 150 degrees to 200 degrees centigrade for an interval ranging from 1 to 5 minutes.

The initial high temperature heating serves a dual purpose. First of all, a sufficient amount of energy is furnished to immediately activate the catalyst and thereby initiate the copolymerization of the impregnant. Secondly, the outer layers and ends of the capacitor roll are partially copolymerized. Thus, with an activated catalyst it is possible to effect post curing of the impregnant at a lower temperature. Further, the partially copolymerized outer layers and ends result in the advantage that the capacitor roll is effectively sealed at the beginning of the curing cycle and leakage of the impregnant during the rest of the cycle is minimized. It was found that the improved dielectric properties in accordance with the present invention could be obtained by carrying out the curing in a hot air oven.

Although in the herein described exemplifications of the invention, the shock curing was done under atmospheric pressure, curing carried out under pressure resulted in a further improvement of the dielectric properties of the capacitor.

The following examples of methods of curing in accordance with this invention are given by way of illustration, and it is not intended thereby to limit in any way the scope of the invention. In all of the examples of the invention, and in the example of a prior method cited for purposes of comparison, a mixture comprising by weight 40 percent poly (alpha methyl styrene), 55 percent vinyl toluene and 5 percent divinyl benzene was used. To this mixture there was added .8 percent by weight of tertiary butyl hydroperoxide, which has a decomposition temperature in benzene of 179 degrees centigrade for a half-life of one minute. The mixture had a viscosity of 11 centipoises at 25 degrees centigrade. All the capacitor rolls used were four and a half cubic inches in volume and three inches long. They were hard rolled, dried and impregnated as hereinbefore described. All corona start voltages, unless otherwise specified, are at a temperature of 25 degrees centigrade.

*Example I*

Figure 2:
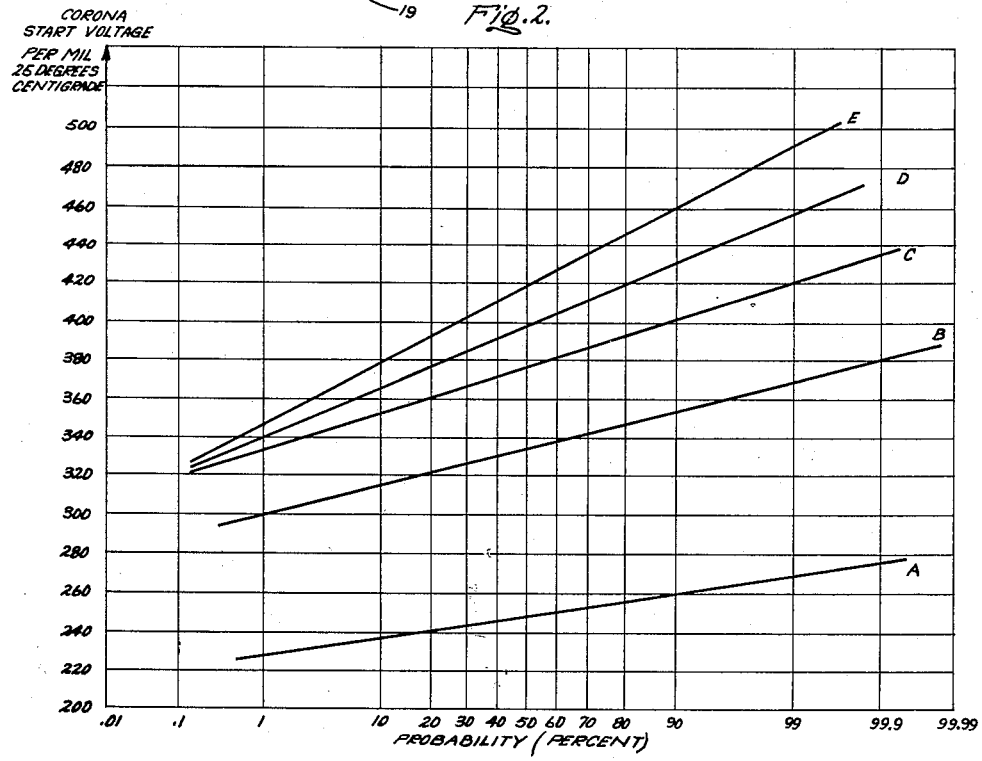
FIG. 2 illustrates a number of corona start voltages versus probability of occurrence curves for capacitors impregnated with a mixture copolymerized in accordance with the present invention as compared with capacitors impregnated with the identical copolymer mixture but cured by a conventional stepped up curing cycle.

The capacitors in this example were cured by a conventional curing cycle in order that they might serve as a comparison basis for the capacitors shock cured in accordance with the invention. After two hours of heating in an air oven at a temperature of 90 degrees centigrade, the temperature was stepped up to 100 degrees centigrade for a period of four hours. This was then followed by curing for a two hour period at a temperature of 125 degrees centigrade. The average corona start voltage of the capacitors was found to be approximately 250 volts per mil. Curve A of FIG. 2 illustrates the probability curve for the corona start voltages obtained for the capacitors of this example. It will be noted that each of the curves shown in FIG. 2 are based on corona start voltage readings taken on at least 100 capacitors. The curves show the probability of occurrence expressed as a percentage of the corona start voltages obtained which are below a given value of a corona start voltage taken at ordinate. As an example, taking the 90 percent point on the abscissa, we find from curve A that 90 percent of the corona start voltages obtained were below 260 volts, the value at the ordinate corresponding to 90 percent, and 10 percent of the values were above 260 volts. Taking the 50 percent point on the abscissa, we obtain from the ordinate the value of the corona start voltage at which 50 percent of measured corona start voltages were found to be above and 50 percent below this value.

*Example II*

To illustrate the stepped down temperature cycle in accordance with the present invention, the capacitors of this example were cured in an air circulated oven at a temperature of 150 degrees centigrade for a period of five minutes and then the temperature was brought down to 125 degrees centigrade within approximately one minute. The capacitors were cured at this temperature for a period of two hours. It was found that improved results are obtainable by employing a higher initial temperature. However, in the oven that was used to prepare the samples it was difficult to bring the temperature of the oven down to 125 degrees centigrade within a period of less than one minute. It is to be noted that the initial temperature of 150 degrees employed in this illustrative example is below the decomposition temperature for a half-life of one minute of the catalyst. Thus, an optimum temperature was not used in this example, but nonetheless it will be noted that the ionization voltage was significantly improved. The average ionization voltage was 335 volts per mil as compared with the 250 volts of the conventionally cured capacitors of Example I. Curve B of FIG. 2 illustrated the curve obtained by plotting the values of the ionization voltages against percent probability for the capacitors of Example II.

*Example III*

The capacitors of this example were shock cured in castor oil at a temperature of 180 degrees for a period of 30 minutes. Surprisingly, it was found that this temperature did not have a detrimental effect on the paper layers. The capacitors of this example had an average ionization voltage of 375 volts per mil. Curve C of FIG. 2 illustrates the probability curve for the ionization voltages of the capacitors of Example III.

*Example IV*

In this illustrative example the capacitors were shock cured in castor oil for a period of 50 minutes at a temperature of 150 degrees centigrade. The capacitors of this example had an average ionization voltage of 395 volts per mil. The values of the ionization voltages obtained are shown plotted against percent probability as shown by curve D in FIG. 2.

*Example V*

The capacitors in this example were shock cured in castor oil for a period of 100 minutes at a temperature of 135 degrees centigrade. The average ionization voltage of the capacitors of this example were found to be 420 volts per mil. As shown by curve E of FIG. 2, the capacitors of this example exhibited the most significantly improved ionization voltages.

It will be seen from the foregoing Examples II, III, IV, and V that the optimum results were obtained in accordance with the shock curing method of this invention in a temperature range between 135 degrees centigrade and 150 degrees centigrade and curing period ranging between 50 and 100 minutes. Based on a comparison of the capacitors of Example I which were cured in a conventional manner, it was found that by shock curing the ionization voltage can be improved from 60 to 70 percent. The real significance of the improved ionization voltage resides in the fact that it is now possible to use a dry type of capacitor employing a resinous impregnant in alternating current applications at voltages which heretofore were not considered to be practicable for dry type of capacitors. Thus, the capacitors produced in accordance with this invention can be used for such applications as power factor capacitors for ballasts, motors and other similar alternating current applications.

Figure 3:
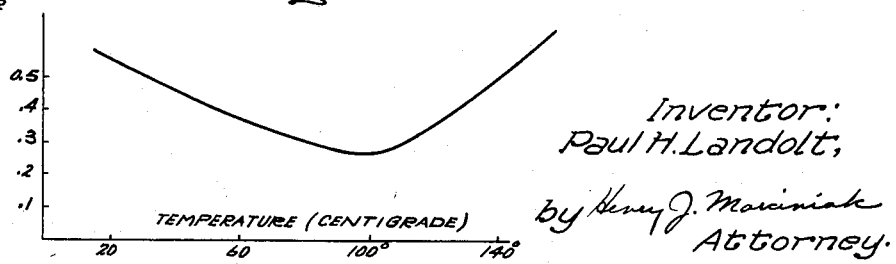
FIG. 3 is a graph of the dissipation factor plotted against temperature for a capacitor produced in accordance with the invention.

The curve illustrated in FIG. 3 shows the dissipation factor versus temperature for a representative capacitor employing a resinous impregnant such as that set forth in Example I—shock cured in accordance with the present invention. It will be seen from the curve that the dissipation factor decreases in value up to approximately 100 degrees centigrade which is, of course, very desirable. Further, the dissipation factor increases slowly over 100 degrees so that at a temperature of 150 degrees centigrade it is approximately the same as it is at 25 degrees centigrade. Thus, it is possible to use the capacitors in high temperature alternating current applications.

Capacitors produced in accordance with the present invention have sufficient mechanical strength to permit them to be used without being encased in a metal container. In the field tests conducted to determine the performance of the capacitors under actual operating conditions as power factor capacitors in a ballast circuit of a lighting fixture, the shock cured capacitors were placed in the asphaltic potting compound in the ballast case, which served as a sealing compound. If desired, the cured capacitors may be sealed with a silicone, epoxy resin, poly urethane, alkyd resin, polyester resin or some other suitable sealing compound.

In these field tests, a first group of twenty capacitors produced in accordance with the invention were installed in twenty alternating current lighting fixture ballast circuits. After 1973 hours of operation, there were no failures. A second group of twenty-six capacitors were similarly tested by actual operation in a ballast circuit for 2015 hours without a single failure. Also, accelerated life tests of the capacitors in alternating current ballast circuits were conducted on twenty-four capacitors for a total of 7437 hours at temperatures from 80 to 142 degrees centigrade, and only three failures occurred. Thus, it will be seen that the field tests and the accelerated life tests confirm the suitability of the capacitors produced according to the present invention for alternating current applications.

While the present invention has been described with reference to specific illustrative examples, it will be understood that numerous modifications may be made by one skilled in the art which are within the scope of this invention. It is to be understood, therefore, that I intend by the appended claims to cover all such modifications as fall within the true spirit and scope of the invention.

What I claim as new and desire to secure by Letters Patent of the United States is:

1. A method of curing a capacitor roll impregnated with a mixture of a monovinyl aryl compound and at least one polyvinyl aryl compound including a polymerization catalyst having a decomposition temperature in benzene between 120 and 180 degrees centigrade corresponding to a half-life of 1 to 10 minutes, said method comprising the steps of heating said capacitor roll at a temperature between 150 and 200 degrees centigrade to activate said catalyst and to effect a crosslinking of the composition in the outer dielectric layers and ends of said roll within a period between one to five minutes in order to seal the capacitor roll and prevent leakage of the impregnant during subsequent curing, and thereafter heating said roll at a temperature from 120 to 150 degrees centigrade for an interval ranging from 5 to 120 minutes to effect at least partial crosslinking of the composition in the inner dielectric layers.

2. A method as set forth in claim 1 in which said heating is carried out in a liquid medium.

3. A method as set forth in claim 1 in which said catalyst comprises at least one of the catalysts of the group consisting of tertiary butyl hydroperoxide, tertiary butyl perbenzoate, dicumyl hydroperoxide, methyl ethyl ketone peroxide, benzoyl peroxide and tertiary butyl peroxyisobutyrate.

4. A method of curing a capacitor roll impregnated with a mixture of a monovinyl aryl compound and at least one polyvinyl aryl compound including a polymerization catalyst in an amount from .1 to 1 percent by weight of said composition, said catalyst having a decomposition temperature from 120 to 180 degrees centigrade for a half-life of one minute to 10 minutes, said method comprising heating said roll at a temperature ranging from 150 to 200 degrees centigrade for a period of time ranging between 1 to 5 minutes to seal the capacitor roll and thereafter heating said roll at a temperature from 120 to 150 degrees centigrade for a period from 5 to 120 minutes.

5. A method of producing a dry type of electric capacitor suitable for alternating current applications comprising winding a pair of metallic foil electrodes and a plurality of porous dielectric layers so that said dielectric layers are interleaved between said electrodes to form a capacitor roll, drying said roll to remove moisture; impregnating said roll with a mixture comprising a monovinyl aryl compound and at least one polyvinyl aryl compound, said composition containing a polymerization catalyst from .1 to 1 percent by weight of said composition and said catalyst having a decomposition temperature from 120 to 180 degrees centigrade for a half-life of 1 minute to 10 minutes; heating said capacitor roll at a temperature from 150 to 200 degrees centigrade to activate said catalyst and to effect a crosslinking of the composition in the outer dielectric layers and ends of said roll within an initial period between one to five minutes to seal the capacitor roll and heating thereafter at a temperature from 120 to 150 degrees centigrade for an interval ranging from 5 to 120 minutes to effect at least partial crosslinking of the composition in the inner dielectric layers of said capacitor roll.

6. A method as set forth in claim 5 in which said capacitor roll is subjected to a pressure above one atmosphere as said capacitor roll is being wound.

7. A method of producing a dry type of electric capacitor suitable for alternating current applications comprising: winding a pair of metallic foil electrodes and a plurality of porous dielectric layers so that said dielectric layers are interleaved between said electrodes to form a capacitor roll, drying said roll to remove moisture; impregnating said roll with a mixture comprising a monovinyl aryl compound and at least one polyvinyl aryl compound, said composition containing a polymerization catalyst from .1 to 1 percent by weight of said composition, said catalyst having a decomposition temperature from 120 to 128 degrees centigrade for a half-life of 1 minute to 10 minutes; and heating said capacitor roll at a temperature between 150 and 200 degrees centigrade to activate said catalyst and to effect a copolymerization of the composition in the outer dielectric layers and ends of said roll within a period of 1 to 5 minutes to seal the capacitor roll followed by post curing at a temperature from 120 to 150 degrees centigrade for a time interval from 5 to 120 minutes.

References Cited in the file of this patent

UNITED STATES PATENTS

| | | |
|---|---|---|
| 1,717,243 | Nauk | June 11, 1929 |
| 2,400,892 | Soday | May 28, 1946 |
| 2,504,744 | Sproull | Apr. 18, 1950 |
| 2,665,400 | Walker | Jan. 5, 1954 |
| 2,684,317 | Burnham | July 20, 1954 |
| 2,738,453 | Robinson | Mar. 13, 1956 |
| 2,793,370 | Jeppson | May 28, 1957 |
| 2,922,937 | Hutzler | Jan. 26, 1960 |
| 2,951,021 | Ruscito | Aug. 30, 1960 |